G. H. JOHNSON.
ANIMAL TRAP.
APPLICATION FILED APR. 16, 1908.

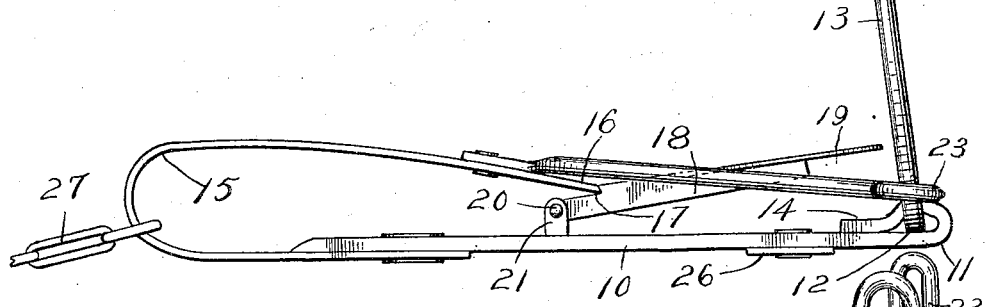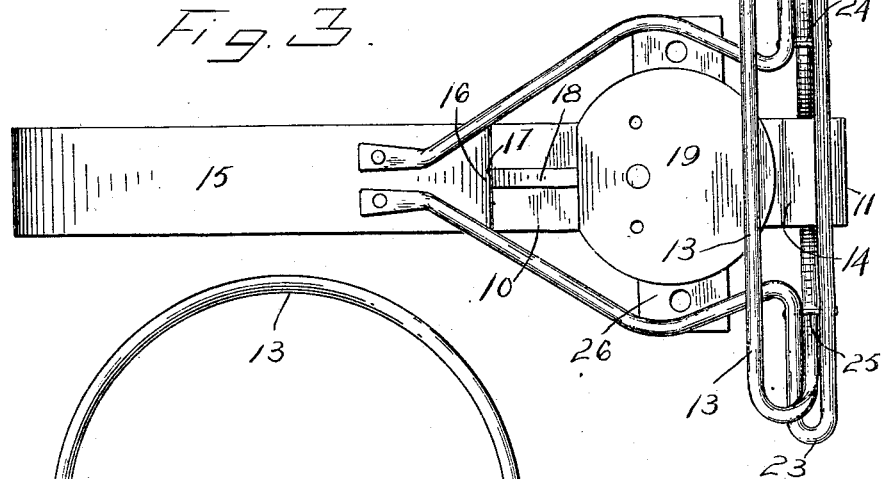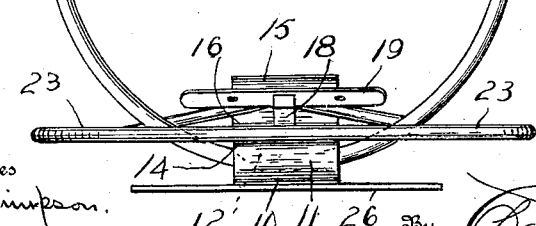

898,581.

Patented Sept. 15, 1908.
2 SHEETS—SHEET 2.

Witnesses
J. C. Simpson
M. F. Miller

Inventor
Gust Harry Johnson

By Chandlee & Chandlee
Attorneys

UNITED STATES PATENT OFFICE.

GUST HARRY JOHNSON, OF ROSEVILLE, ILLINOIS.

ANIMAL-TRAP.

No. 898,581.

Specification of Letters Patent.

Patented Sept. 15, 1908.

Application filed April 16, 1908. Serial No. 427,472.

*To all whom it may concern:*

Be it known that I, GUST HARRY JOHNSON, a citizen of the United States, residing at Roseville, in the county of Warren, State of Illinois, have invented certain new and useful Improvements in Animal-Traps; and I do hereby declare the following to be a full, clear, and exact description of the invention, such as will enable others skilled in the art to which it appertains to make and use the same.

This invention relates to animal traps and has for its object to simplify and improve the construction, and increase the efficiency and utility of devices of this character.

One of the objects of the invention is to produce a trap which may be constructed at slight expense and operated effectually for the smaller as well as larger animals, and may be arranged in any locality where traps may be required.

Figure 2:
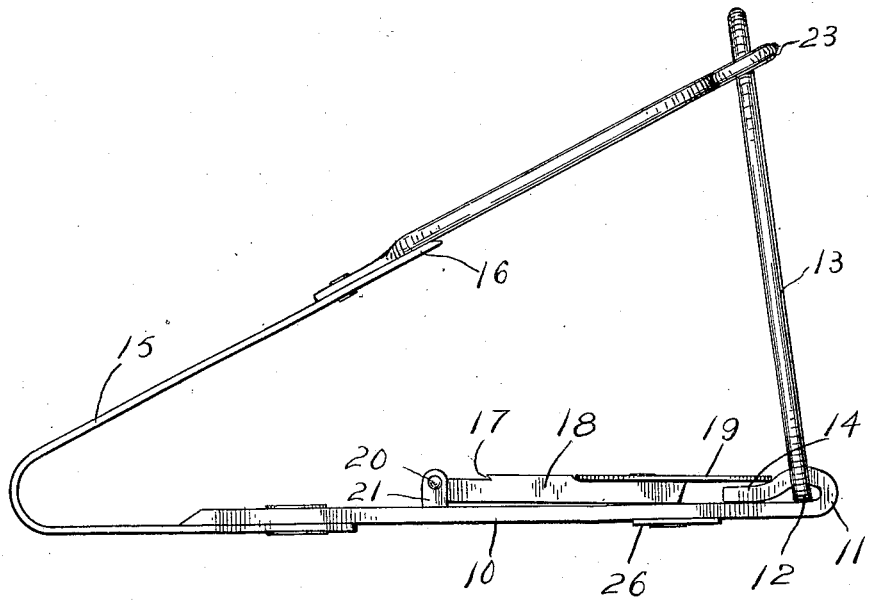
Figure 5:
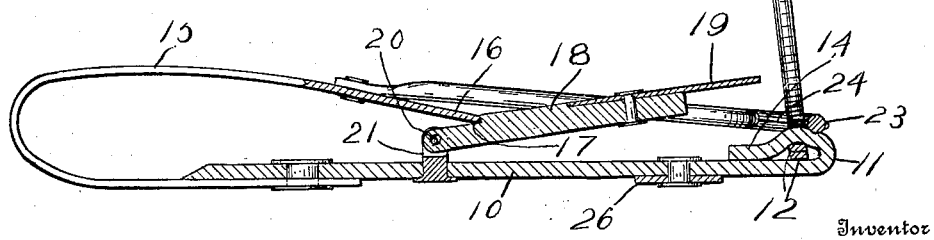

With these and other objects in view the invention consists in certain novel features of construction hereafter shown and described and then specifically pointed out in the claims, and in the drawings illustrating the preferred embodiment of the invention, Figure 1 is a side elevation of the trap in "set" position. Fig. 2 is a side elevation of the trap in released position. Fig. 3 is a top plan view of the trap in "set" position. Fig. 4 is a front elevation of the trap in "set" position. Fig. 5 is a longitudinal section taken vertically through the trap in "set" position.

The improved device is constructed wholly of metal, preferably of steel, or partially of steel and partially of cast or malleable iron and consists of a base 10 in the form of a flat bar with an aperture at one end and with the other end bent upon itself to form a transverse socket 11, the socket designed to receive the flattened portion 12 of an endless loop 13, the loop being thus held in position substantially at right angles to the base, and requires no other fastening as the base 10 will be of sufficiently heavy metal, so that when the bent over portion 14 engages the flat portion 11, a blow of a hammer will effectually couple the parts rigidly together.

Riveted or otherwise fastened to the rear end of the base 10 is a U-shaped spring member 15, the upper free end of the spring member being inclined at 16 to engage a notch 17 in a trigger element 18, the latter provided with a bait pan 19 and pivoted at 20 between spaced ears 21 rising from the base, as shown.

Connected to the spring member 15 near its free end is a choke element formed of a single piece of wire bent into the required shape with an elongated loop 23 at the forward end for passing over the endless loop 13, and the rear converging ends riveted or otherwise secured to the spring 15 near its free end, the spring and the choke element thus being rigidly united and moving in unison.

The elongated loop portion 23 is provided with transverse couplings members 24—25 bearing inside of the endless loop and operating to prevent the choke element from being released entirely from the endless loop when the trigger is released.

The base member 10 is provided with a transverse plate 26 having perforations at its end to enable the trap to be permanently fastened to a stationary support, as for instance, to a floor or to a tree or the like. A chain 27 may also be attached to enable the trap to be fastened beneath the water or other locality if required.

The bait pan 19 is provided with apertures to enable the bait to be fastened thereto by wires if required.

With the device thus constructed it will be obvious that when the trigger element is connected to the inclined portion 16 of the spring, the latter will be retained in its depressed position, with the choke element at its lowest point, and requiring that the animal in order to reach the bait must insert its head through the endless loop and above the choke element, then when the trigger is released by the efforts of the animal to detach the bait, the choke element will be released and the animal destroyed.

It will be obvious that in setting the trap it will be necessary to insert it between stationary walls of some kind so that the animal can reach the bait only through the endless loop 13, or if preferred the trap may be concealed so that nothing is in view except the bait.

The trap may be formed in various sizes, to suit animals of different sizes, and may be inexpensively constructed, and being wholly of metal is practically indestructible.

What is claimed, is:—

1. An animal trap comprising a base member, a U-shaped spring connected at one end thereof to said base at one end of the same, an endless loop supported from said base at the other end, a choke member connected at one end to the free end of said spring and formed with a terminal loop movable over said endless loop, and a bait trigger carried by said base and operating to hold said spring and the choke member carried thereby in depressed position.

2. In an animal trap, an endless loop of wire flattened at one part, a base member comprising a metallic bar bent upon itself at one end and around said flattened portion of the endless loop and maintaining the same at an angle to the base, a U spring connected at one end thereof to the other end of the base, a choke member connected at one end to the free end of said spring and formed with a terminal loop movable over said endless loop, and a bait trigger carried by said base and operating to hold said spring and the choke member carried thereby depressed.

3. An animal trap comprising a base member, an endless loop connected to said base member at one end and maintained at an angle thereto, a U spring connected at one end to the other end of said base member, a choke member formed from a single piece of wire bent intermediate its ends into an elongated loop for movably engaging the endless loop and with the remaining portions converging and connected to the free end of the spring, guard wires connecting the sides of the elongated loop and extending through the endless loop, and a trigger device carried by the base and operating to maintain the spring in depressed position.

In testimony whereof, I affix my signature, in presence of two witnesses.

GUST HARRY JOHNSON.

Witnesses:
  D. E. GAYER,
  LOUIS NORMAN.